United States Patent [19]

Sakurai

[11] Patent Number: 4,459,674
[45] Date of Patent: Jul. 10, 1984

[54] VOICE INPUT/OUTPUT APPARATUS

[75] Inventor: Atsushi Sakurai, Yokohama, Japan

[73] Assignee: Canon Kabushiki Kaisha, Tokyo, Japan

[21] Appl. No.: 347,634

[22] Filed: Feb. 10, 1982

[30] Foreign Application Priority Data

Feb. 20, 1981 [JP] Japan ............................. 56-22920

[51] Int. Cl.³ ............................................. G10L 1/00
[52] U.S. Cl. ............................. 364/513.5; 381/41; 381/51
[58] Field of Search ................... 381/41–53; 364/513.5, 513

[56] References Cited

U.S. PATENT DOCUMENTS 4,227,046 10/1980 Nakajima et al. ................ 381/47

OTHER PUBLICATIONS

Teja, "Voice Input and Output", EDN, Nov. 20, 1979, pp. 159–167.

Primary Examiner—E. S. Matt Kemeny
Attorney, Agent, or Firm—Fitzpatrick, Cella, Harper & Scinto

[57] ABSTRACT

An apparatus with both voice recognition and voice synthesis provides simultaneous and non-interfering operation by inserting reverse stop filters in the recognition system controlled by the synthesizer active voiced parameters.

5 Claims, 2 Drawing Figures

VOICE INPUT/OUTPUT APPARATUS

BACKGROUND OF THE INVENTION

1. Field of the Invention

The present invention relates to a voice input/output apparatus which has a voice recognition device and a synthesizing type voice response device, so that the apparatus may respond to an input voice with an output voice.

2. Description of the Prior Art

With recent advances in voice processing technique, a voice input/output apparatus is proposed which is of the type having the function of voice recognition and response by synthesis of a voice. However, in the conventional voice input/output apparatus of this type, when it is necessary to recognize an input voice and to process input data during response by a voice, the output voice for response is mixed in the desired input voice, so that the recognition ratio of the input voice is degraded.

FIG. 1 is a block diagram showing the configuration of a conventional voice input/output apparatus of this type. In the conventional voice input/output apparatus of this type, a data processor for generating output data for response with a voice is interposed between a voice recognition device and a voice response device. FIG. 1, however, shows only the voice response device and the voice recognition device of totally different systems for voice conversion in separate conditions. In the example shown in FIG. 1, the voice response device is a voice synthesizing unit of the PARCOR type, that is a, partial auto-correlation type. However, the voice may be synthesized in any manner. In the conventional voice input/output apparatus of the configuration shown in FIG. 1, a voice response device shown above the dotted line in FIG. 1 stores voice source data for response with voice frequency data (a voiced sound if the frequency is 0 and an unvoiced sound if the frequency is more than 0) in a voice source data register, and stores a PARCOR coefficient representing vocal resonance characteristics for PARCOR type voice synthesis in a PARCOR coefficient register 2. The voice response device reads out voice source data from the voice source register 1 and makes a voice source circuit 3 output a pulse train signal obtained by modulation. The pulse train signal is supplied to a PARCOR synthesizing operation unit 4. In response to the PARCOR coefficient read out from the PARCOR coefficient register 2, the PARCOR synthesizing operation unit 4 performs a synthesizing operation of PARCOR type voice synthesis to generate a digital signal representing a voice corresponding to the voice source data. The digital signal representing the voice corresponding to the voice source data is supplied to a digital/analog converter 5 (to be referred to as a D/A converter hereinafter) which converts the input digital signal into an analog voice signal. The analog voice signal obtained from a synthesized voice output terminal 6 is supplied to a speaker 7 which generates a desired output response voice. The PARCOR synthesizing operation unit 4 synthesizes a voice by passing the pulse train signal output from the voice source circuit 3 through a filter which simulates the resonance characteristics of a vocal cord. This filter comprises a delay element, a correlator, two multipliers, and two adders. The characteristic parameter generally used in the PARCOR synthesizing operation unit is the data obtained by adding the PARCOR coefficient to the voice source data.

In the voice recognition device shown below the dotted line in FIG. 1, the analog voice signal from a microphone 8 is fed through a voice input terminal 9 to an analog-digital converter 10 (to be referred to as an A/D converter) which converts the input analog voice signal into a digital voice signal. The digital voice signal is supplied to a voice recognition device 12 through an input voice output terminal 11. The voice recognition device 12 recognizes the voice data corresponding to the input voice.

In the conventional voice input/output apparatus of the configuration as described above, if, during the generation of the output response voice from the speaker in the voice response device, an input voice signal is supplied to the voice recognition device through a microphone sufficiently separated from the speaker, the synthesized output voice signal from the voice response device is mixed in the input voice signal to the voice recognition device, correct recognition of the input voice cannot be performed, and the ratio of correct voice recognition is significantly degraded.

SUMMARY OF THE INVENTION

It is an object of the present invention to provide a voice input/output apparatus which eliminates the drawbacks of the conventional apparatus and which prevents a decrease in a recognition ratio of an input voice if the input voice is supplied during generation of the output response voice.

It is another object of the present invention to provide a voice input/output apparatus which incorporates a reversal filter which filters an input voice and which uses a characteristic parameter for synthesis of a voice for response, so that output voice components mixed in the input voice may be removed and the decrease in the recognition ratio of the input voice may be prevented.

It is still another object of the present invention to provide a voice input/output apparatus which does not allow interference between an output voice from a voice response device and an input voice to a voice recognition device.

Other objects and features of the present invention will become apparent from the following detailed description when taken in conjunction with the accompanying drawings.

DETAILED DESCRIPTION OF THE PREFERRED EMBODIMENTS

Figure 1:
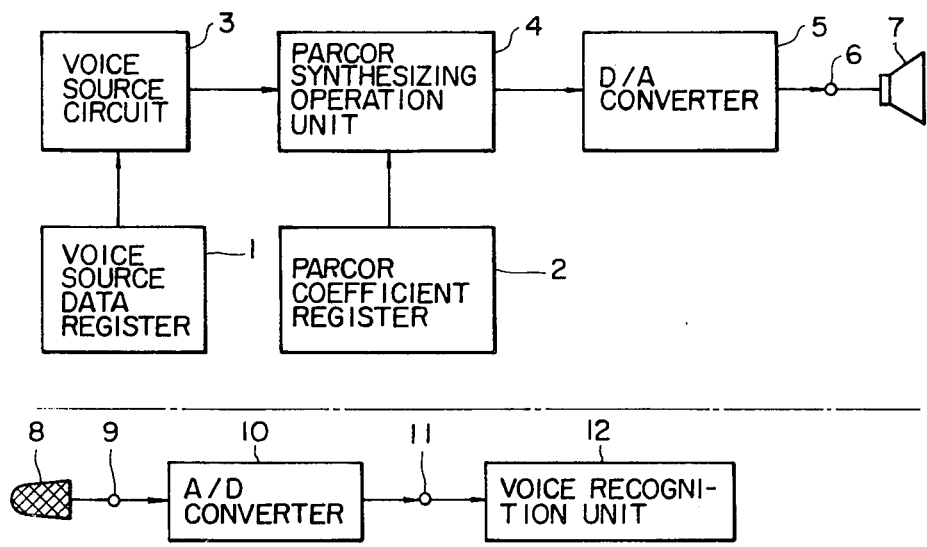
FIG. 1 is a block diagram showing the configuration of a conventional voice input/output apparatus.
Figure 2:
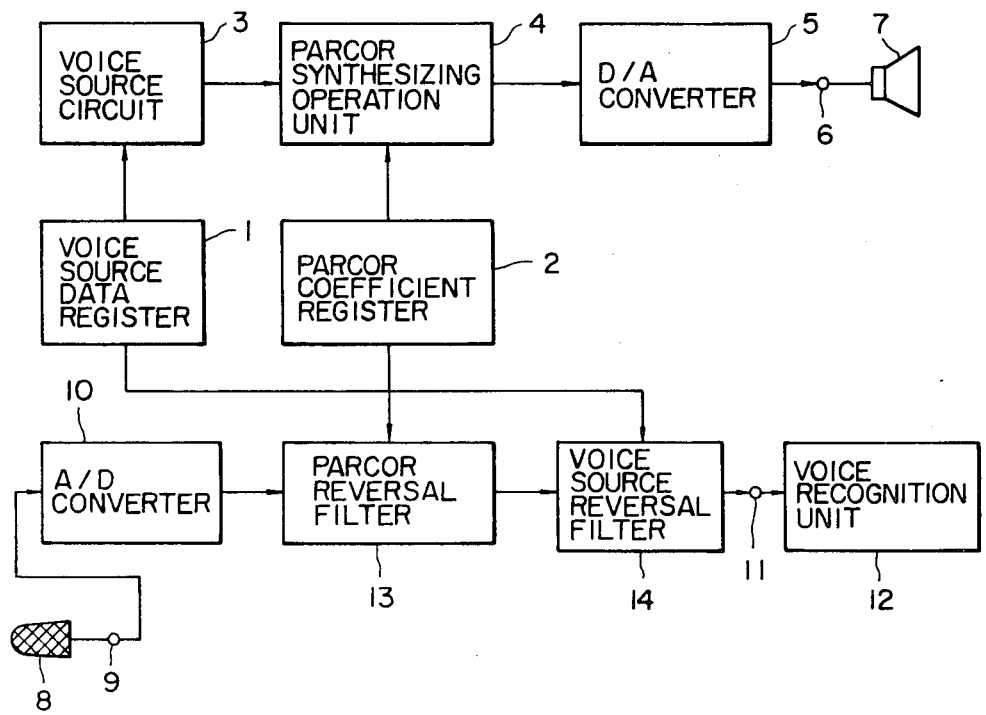
FIG. 2 is a block diagram showing the configuration of a voice input/output apparatus according to the present invention.

FIG. 2 is a block diagram showing the configuration of a voice input/output apparatus according to the present invention. The same reference numerals in FIG. 2 denote the same parts as in FIG. 1. The voice source data register 1 stores the voice source data, the frequency data for response in a voice (a voiced sound if the frequency is 0 and an unvoiced sound if the frequency is more than 0). The PARCOR coefficient register 2 stores the PARCOR coefficient representing the characteristics of the vocal chord for PARCOR voice synthesis. The voice source circuit 3 modulates the voice source data which is read out from the voice source register 1 into a pulse train signal. The PARCOR synthesizing operation unit 4 generates a digital signal representing a voice corresponding to the voice source data by performing an operation for PARCOR voice synthesis on the basis of the PARCOR coefficient read out and supplied from the PARCOR coefficient register 2. The D/A converter 5 converts the digital signal output from the PARCOR synthesizing operation unit 4 into an analog voice signal. The synthesized voice output terminal 6 is for providing the analog voice signal from the D/A converter 5. The speaker 7 is connected to this synthesized voice output terminal 6 for generating a desired response output voice.

The voice input/output apparatus of the present invention is the same as the conventional apparatus shown in FIG. 1 with respect to the units described above. However, in the voice input/output apparatus of the present invention, a series connection of a PARCOR reversal filter 13 and a voice source reversal filter 14 is interposed between the input voice output terminal 11 and the A/D converter 10 which converts the analog signal fed from the microphone 8 through the voice input terminal 9 into a digital voice signal. The PARCOR coefficient from the PARCOR coefficient register 2 in the voice response device is supplied to the PARCOR reversal filter 13. The voice source data from the voice source register 1 in the voice response device is supplied to the voice source reversal filter 14. By adding this series connection to the conventional circuitry, the output voice components from the voice response device which are mixed in the input voice to the voice recognition device may be removed therefrom.

The PARCOR coefficient which is supplied to the PARCOR synthesizing operation unit 4 is also supplied to the PARCOR reversal filter 13 which has the reverse characteristics to the those of the PARCOR voice synthesizing filter of the PARCOR synthesizing operation unit 4 in the voice response device. The PARCOR reversal filter 13 filters the input voice digital signal supplied from the A/D converter 10 in the voice recognition device. The voice source data which is supplied to the voice source circuit 3 is also supplied to the voice source reversal filter 14. The voice source reversal filter 14 further filters the output digital voice signal from the PARCOR reversal filter 13. In this manner, the synthesized voice signal components from the voice response device which are mixed in the input voice signal to the voice recognition device are removed, so that the input voice digital signal which contains only the desired input voice data is obtained from the input voice output terminal 11 to be supplied to the voice recognition device 12.

As for processing during a period in which no voice output is obtained from the voice response device, "voiced sound data" stored, in advance, in the voice source data register 1 and the PARCOR coefficient register 2. If no synthesized output voice component from the voice response device is mixed in the input voice to the voice recognition device, both the PARCOR reversal filter 13 and the voice source reversal filter 14 are rendered inoperative and pass the input signal without any modification. In this manner, the input voice may not be affected in any manner if no voice output is mixed in the input voice.

As may be seen from the above description, according to the present invention, correct recognition of the input voice may be achieved regardless of whether a voice is being produced by the voice response device.

In the description above, voice synthesis at the voice synthesis device is performed by the PARCOR system. However, the present invention is not limited to this. The present invention may be similarly applied to any voice synthesis system which performs voice synthesis on the basis of a characteristic parameter representing voice data for response.

What I claim is:

1. A voice input/output apparatus comprising:
   storing means for storing characteristic data to be output with a voice;
   voice synthesizing means for synthesizing a voice on the basis of the characteristic data stored in said storing means;
   voice producing means for producing voice data synthesized by said voice synthesizing means;
   input means for receiving voice data to be recognized together with the voice data from said voice producing means;
   removing means for removing the voice data produced by said voice producing means from the voice data received by said input means; and
   voice recognizing means for recognizing the voice data from which the voice data output from said voice producing means has been removed by said removing means.

2. An apparatus according to claim 1, wherein said voice synthesizing means comprises a filter for voice synthesis.

3. An apparatus according to claim 1, wherein the characteristic data consists of voice source data and data representing vocal chord resonance characteristics.

4. An apparatus according to claim 1, wherein said storing means comprises a first register which stores voice source data and a second register which stores data representing vocal chord resonance characteristics.

5. An apparatus according to claim 1, wherein said removing means comprises a filter which filters the characteristic data which are subjected to voice synthesis by said voice synthesizing means from the voice data received by said input means.

* * * * *

UNITED STATES PATENT AND TRADEMARK OFFICE
CERTIFICATE OF CORRECTION

PATENT NO. : 4,459,674

DATED : July 10, 1984

INVENTOR(S) : ATSUSHI SAKURAI

It is certified that error appears in the above-identified patent and that said Letters Patent is hereby corrected as shown below:

Column 1, line 33, delete comma after "a"; insert comma after "is".

Column 2, line 18, after "microphone" insert --not--.

Column 3, line 37, delete "the" (first occurrence);

line 56, after "data" insert --is--.

Column 4, line 45, change "chord" to --cord--;

line 50, change "chord" to --cord--.

Signed and Sealed this

Eighteenth Day of June 1985

[SEAL]

Attest:

DONALD J. QUIGG

Attesting Officer   Acting Commissioner of Patents and Trademarks